(12) United States Patent
El Dokor et al.

(10) Patent No.: US 11,455,712 B2
(45) Date of Patent: *Sep. 27, 2022

(54) METHOD AND APPARATUS FOR ENHANCING STEREO VISION

(71) Applicant: Edge 3 Technologies, Inc., Phoenix, AZ (US)

(72) Inventors: Tarek El Dokor, Phoenix, AZ (US); Jordan Cluster, Tempe, AZ (US)

(73) Assignee: Edge 3 Technologies, Phoenix, AZ (US)

( * ) Notice: Subject to any disclaimer, the term of this patent is extended or adjusted under 35 U.S.C. 154(b) by 110 days.

This patent is subject to a terminal disclaimer.

(21) Appl. No.: 17/087,522

(22) Filed: Nov. 2, 2020

(65) Prior Publication Data

US 2021/0049748 A1   Feb. 18, 2021

Related U.S. Application Data

(63) Continuation of application No. 15/993,414, filed on May 30, 2018, now Pat. No. 10,825,159, which is a
(Continued)

(51) Int. Cl.
*G06K 9/00* (2022.01)
*G06T 7/00* (2017.01)
(Continued)

(52) U.S. Cl.
CPC .................. *G06T 7/00* (2013.01); *G06K 9/00* (2013.01); *G06K 9/6218* (2013.01); *G06T 7/11* (2017.01);
(Continued)

(58) Field of Classification Search
CPC ........ B81C 99/005; G01P 21/00; G01P 15/08; G06T 2207/20144; G06T 7/2006;
(Continued)

(56) References Cited

U.S. PATENT DOCUMENTS 5,454,043 A   9/1995 Freeman
5,544,050 A   8/1996 Abe et al.
(Continued)

OTHER PUBLICATIONS

Freeman, W. T. et al., "The Design and Use of Steerable Filters", *IEEE Transactions of Pattern Analysis and Machine Intelligence* V. 13, (Sep. 1991),891-906.
(Continued)

*Primary Examiner* — William C Vaughn, Jr.
*Assistant Examiner* — Naod W Belai
(74) *Attorney, Agent, or Firm* — Gordon Kessler

(57) ABSTRACT

A method and apparatus for segmenting an image are provided. The method may include the steps of clustering pixels from one of a plurality of images into one or more segments, determining one or more unstable segments changing by more than a predetermined threshold from a prior of the plurality of images, determining one or more segments transitioning from an unstable to a stable segment, determining depth for one or more of the one or more segments that have changed by more than the predetermined threshold, determining depth for one or more of the one or more transitioning segments, and combining the determined depth for the one or more unstable segments and the one or more transitioning segments with a predetermined depth of all segments changing less than the predetermined threshold from the prior of the plurality of images.

20 Claims, 7 Drawing Sheets

Related U.S. Application Data continuation of application No. 15/136,904, filed on Apr. 23, 2016, now Pat. No. 10,037,602, which is a continuation of application No. 14/226,858, filed on Mar. 27, 2014, now Pat. No. 9,324,154, which is a continuation of application No. 13/316,606, filed on Dec. 12, 2011, now Pat. No. 8,718,387, which is a continuation of application No. 13/297,029, filed on Nov. 15, 2011, now Pat. No. 8,705,877, which is a continuation of application No. 13/294,481, filed on Nov. 11, 2011, now Pat. No. 9,672,609.

(51) Int. Cl.
    *G06T 7/593*     (2017.01)
    *G06T 7/11*     (2017.01)
    *G06T 7/174*     (2017.01)
    *G06T 7/187*     (2017.01)
    *G06V 20/64*     (2022.01)
    *G06V 30/194*     (2022.01)
    *G06K 9/62*     (2022.01)

(52) U.S. Cl.
CPC .............. *G06T 7/174* (2017.01); *G06T 7/187* (2017.01); *G06T 7/593* (2017.01); *G06V 20/64* (2022.01); *G06V 30/194* (2022.01); *H05K 999/99* (2013.01); *G06T 2200/04* (2013.01); *G06T 2207/10021* (2013.01); *G06T 2207/10024* (2013.01); *G06T 2207/20112* (2013.01)

(58) Field of Classification Search
CPC ......... G06T 7/0079; G06T 2207/10024; G06T 2207/20141; G06T 7/0081; G06T 7/0075; G06T 7/174; G06T 7/593; G06T 7/187; G06T 7/11; G06T 7/00; G06T 2200/04; G06T 2207/20112; G06T 2207/10021; G06K 9/00201; G06K 9/00; G06K 9/6218; G06V 30/194; G06V 20/64; H05K 999/99
USPC ........... 324/754; 348/46; 382/173, 154, 128, 382/224, 225, 134
See application file for complete search history.

(56) References Cited

U.S. PATENT DOCUMENTS

| | | | |
|---|---|---|---|
| 5,581,276 A | 12/1996 | Cipolla et al. |
| 5,594,469 A | 1/1997 | Freeman et al. |
| 5,699,441 A | 12/1997 | Sagawa et al. |
| 5,767,842 A | 6/1998 | Korth |
| 5,887,069 A | 3/1999 | Sakou et al. |
| 5,990,865 A | 11/1999 | Gard |
| 6,002,808 A | 12/1999 | Freeman |
| 6,072,494 A | 6/2000 | Nguyen |
| 6,075,895 A | 6/2000 | Qiao et al. |
| 6,115,482 A | 9/2000 | Sears et al. |
| 6,128,003 A | 10/2000 | Smith et al. |
| 6,141,434 A | 10/2000 | Christian et al. |
| 6,147,678 A | 11/2000 | Kumar et al. |
| 6,181,343 B1 | 1/2001 | Lyons |
| 6,195,104 B1 | 2/2001 | Lyons |
| 6,204,852 B1 | 3/2001 | Kumar et al. |
| 6,215,890 B1 | 4/2001 | Matsuo et al. |
| 6,222,465 B1 | 4/2001 | Kumar et al. |
| 6,240,197 B1 | 5/2001 | Christian et al. |
| 6,240,198 B1 | 5/2001 | Rehg et al. |
| 6,252,598 B1 | 6/2001 | Segen |
| 6,256,033 B1 | 7/2001 | Nguyen |
| 6,256,400 B1 | 7/2001 | Takata et al. |
| 6,269,172 B1 | 7/2001 | Rehg et al. |
| 6,323,942 B1 | 11/2001 | Bamji |
| 6,324,453 B1 | 11/2001 | Breed et al. |
| 6,360,003 B1 | 3/2002 | Doi et al. |
| 6,363,160 B1 | 3/2002 | Bradski et al. |
| 6,377,238 B1 | 4/2002 | McPheters |
| 6,389,182 B1 | 5/2002 | Ihara et al. |
| 6,394,557 B2 | 5/2002 | Bradski |
| 6,400,830 B1 | 6/2002 | Christian et al. |
| 6,434,255 B1 | 8/2002 | Harakawa |
| 6,442,465 B2 | 8/2002 | Breed et al. |
| 6,456,728 B1 | 9/2002 | Doi et al. |
| 6,478,432 B1 | 11/2002 | Dyner |
| 6,509,707 B2 | 1/2003 | Yamashita et al. |
| 6,512,838 B1 | 1/2003 | Rafii et al. |
| 6,526,156 B1 | 2/2003 | Black et al. |
| 6,553,296 B2 | 4/2003 | Breed et al. |
| 6,556,708 B1 | 4/2003 | Christian et al. |
| 6,571,193 B1 | 5/2003 | Unuma et al. |
| 6,590,605 B1 | 7/2003 | Eichenlaub |
| 6,600,475 B2 | 7/2003 | Gutta et al. |
| 6,608,910 B1 | 8/2003 | Srinivasa et al. |
| 6,614,422 B1 | 9/2003 | Rafii et al. |
| 6,624,833 B1 | 9/2003 | Kumar et al. |
| 6,674,877 B1 | 1/2004 | Jojic et al. |
| 6,674,895 B2 | 1/2004 | Rafii et al. |
| 6,678,425 B1 | 1/2004 | Flores et al. |
| 6,681,031 B2 | 1/2004 | Cohen et al. |
| 6,683,968 B1 | 1/2004 | Pavlovic et al. |
| 6,757,571 B1 | 6/2004 | Toyama |
| 6,766,036 B1 | 7/2004 | Pryor |
| 6,768,486 B1 | 7/2004 | Szabo et al. |
| 6,788,809 B1 | 9/2004 | Grzeszczuk et al. |
| 6,795,567 B1 | 9/2004 | Cham et al. |
| 6,801,637 B2 | 10/2004 | Voronka et al. |
| 6,804,396 B2 | 10/2004 | Higaki et al. |
| 6,829,730 B2 | 12/2004 | Nadeau-Dostie et al. |
| 6,857,746 B2 | 2/2005 | Dyner |
| 6,901,561 B1 | 5/2005 | Kirkpatrick et al. |
| 6,937,742 B2 | 8/2005 | Roberts et al. |
| 6,940,646 B2 | 9/2005 | Taniguchi et al. |
| 6,944,315 B1 | 9/2005 | Zipperer et al. |
| 6,950,534 B2 | 9/2005 | Cohen et al. |
| 6,993,462 B1 | 1/2006 | Pavlovic et al. |
| 7,039,676 B1 | 5/2006 | Day et al. |
| 7,046,232 B2 | 5/2006 | Inagaki et al. |
| 7,050,606 B2 | 5/2006 | Paul et al. |
| 7,050,624 B2 | 5/2006 | Dialameh et al. |
| 7,058,204 B2 | 6/2006 | Hildreth et al. |
| 7,065,230 B2 | 6/2006 | Yuasa et al. |
| 7,068,842 B2 | 6/2006 | Liang et al. |
| 7,095,401 B2 | 8/2006 | Liu et al. |
| 7,102,615 B2 | 9/2006 | Marks |
| 7,129,927 B2 | 10/2006 | Mattson |
| 7,170,492 B2 | 1/2007 | Bell |
| 7,190,811 B2 | 3/2007 | Ivanov |
| 7,203,340 B2 | 4/2007 | Gorodnichy |
| 7,212,663 B2 | 5/2007 | Tomasi |
| 7,221,779 B2 | 5/2007 | Kawakami et al. |
| 7,224,830 B2 | 5/2007 | Nefian et al. |
| 7,224,851 B2 | 5/2007 | Kinjo |
| 7,233,320 B1 | 6/2007 | Lapstun et al. |
| 7,236,611 B2 | 6/2007 | Roberts et al. |
| 7,239,718 B2 | 7/2007 | Park et al. |
| 7,257,237 B1 | 8/2007 | Luck et al. |
| 7,274,800 B2 | 9/2007 | Nefian et al. |
| 7,274,803 B1 | 9/2007 | Sharma et al. |
| 7,289,645 B2 | 10/2007 | Yamamoto et al. |
| 7,295,709 B2 | 11/2007 | Cootes et al. |
| 7,296,007 B1 | 11/2007 | Funge et al. |
| 7,308,112 B2 | 11/2007 | Fujimura et al. |
| 7,340,077 B2 | 3/2008 | Gokturk et al. |
| 7,340,078 B2 | 3/2008 | Shikano et al. |
| 7,342,485 B2 | 3/2008 | Joehl et al. |
| 7,346,192 B2 | 3/2008 | Yuasa et al. |
| 7,348,963 B2 | 3/2008 | Bell |
| 7,359,529 B2 | 4/2008 | Lee |
| 7,372,977 B2 | 5/2008 | Fujimura et al. |
| 7,379,563 B2 | 5/2008 | Shamaie |
| 7,391,409 B2 | 6/2008 | Zalewski et al. |
| 7,394,346 B2 | 7/2008 | Bodin |

(56) References Cited

U.S. PATENT DOCUMENTS

| | | |
|---|---|---|
| 7,412,077 B2 | 8/2008 | Li et al. |
| 7,415,126 B2 | 8/2008 | Breed et al. |
| 7,415,212 B2 | 8/2008 | Matsushita et al. |
| 7,421,093 B2 | 9/2008 | Hildreth et al. |
| 7,423,540 B2 | 9/2008 | Kisacanin |
| 7,444,001 B2 | 10/2008 | Roberts et al. |
| 7,450,736 B2 | 11/2008 | Yang et al. |
| 7,460,690 B2 | 12/2008 | Cohen et al. |
| 7,477,758 B2 | 1/2009 | Piirainen et al. |
| 7,489,308 B2 | 2/2009 | Blake et al. |
| 7,489,806 B2 | 2/2009 | Mohri et al. |
| 7,499,569 B2 | 3/2009 | Sato et al. |
| 7,512,262 B2 | 3/2009 | Criminisi et al. |
| 7,519,223 B2 | 4/2009 | Dehlin et al. |
| 7,519,537 B2 | 4/2009 | Rosenberg |
| 7,545,417 B2 | 6/2009 | Miwa |
| 7,574,020 B2 | 8/2009 | Shamaie |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,599,547 B2 | 10/2009 | Sun et al. |
| 7,606,411 B2 | 10/2009 | Venetsky et al. |
| 7,614,019 B2 | 11/2009 | Rimas Ribikauskas et al. |
| 7,620,316 B2 | 11/2009 | Boillot |
| 7,646,372 B2 | 1/2010 | Marks et al. |
| 7,660,437 B2 | 2/2010 | Breed |
| 7,665,041 B2 | 2/2010 | Wilson et al. |
| 7,676,062 B2 | 3/2010 | Breed et al. |
| 7,720,282 B2 | 5/2010 | Blake et al. |
| 7,721,207 B2 | 5/2010 | Nilsson |
| 7,804,998 B2 | 9/2010 | Mundermann et al. |
| 8,026,842 B2 | 9/2011 | Fox |
| 8,379,926 B2 | 2/2013 | Kanhere |
| 8,705,877 B1 | 4/2014 | Cluster |
| 8,718,387 B1 | 5/2014 | El Dokor |
| 8,761,509 B1 | 6/2014 | Cluster |
| 2001/0001182 A1 | 5/2001 | Ito et al. |
| 2001/0030642 A1 | 10/2001 | Sullivan et al. |
| 2002/0041327 A1 | 4/2002 | Hildreth et al. |
| 2002/0064382 A1 | 5/2002 | Hildreth et al. |
| 2002/0090133 A1 | 7/2002 | Kim et al. |
| 2002/0140633 A1 | 10/2002 | Rafii et al. |
| 2004/0183775 A1 | 9/2004 | Bell |
| 2005/0002074 A1 | 1/2005 | McPheters et al. |
| 2005/0083314 A1 | 4/2005 | Shalit et al. |
| 2005/0105775 A1 | 5/2005 | Luo et al. |
| 2005/0190443 A1 | 9/2005 | Nam et al. |
| 2005/0286756 A1 | 12/2005 | Hong et al. |
| 2006/0093186 A1 | 5/2006 | Ivanov |
| 2006/0101354 A1 | 5/2006 | Hashimoto et al. |
| 2006/0136846 A1 | 6/2006 | Im et al. |
| 2006/0139314 A1 | 6/2006 | Bell |
| 2006/0221072 A1 | 10/2006 | Se et al. |
| 2007/0055427 A1 | 3/2007 | Sun et al. |
| 2007/0113207 A1 | 5/2007 | Gritton |
| 2007/0132721 A1 | 6/2007 | Glomski et al. |
| 2007/0195997 A1 | 8/2007 | Paul et al. |
| 2007/0263932 A1 | 11/2007 | Bernardin et al. |
| 2007/0280505 A1 | 12/2007 | Breed |
| 2008/0002878 A1 | 1/2008 | Meiyappan et al. |
| 2008/0005703 A1 | 1/2008 | Radivojevic et al. |
| 2008/0013793 A1 | 1/2008 | Hillis et al. |
| 2008/0037875 A1 | 2/2008 | Kim et al. |
| 2008/0052643 A1 | 2/2008 | Ike et al. |
| 2008/0059578 A1 | 3/2008 | Albertson et al. |
| 2008/0065291 A1 | 3/2008 | Breed |
| 2008/0069415 A1 | 3/2008 | Schildkraut et al. |
| 2008/0069437 A1 | 3/2008 | Baker |
| 2008/0104547 A1 | 5/2008 | Morita et al. |
| 2008/0107303 A1 | 5/2008 | Kim et al. |
| 2008/0120577 A1 | 5/2008 | Ma et al. |
| 2008/0178126 A1 | 7/2008 | Beeck et al. |
| 2008/0181459 A1 | 7/2008 | Martin et al. |
| 2008/0219501 A1 | 9/2008 | Matsumoto |
| 2008/0219502 A1 | 9/2008 | Shamaie |
| 2008/0225041 A1 | 9/2008 | El Dokor et al. |
| 2008/0229255 A1 | 9/2008 | Linjama et al. |
| 2008/0240502 A1 | 10/2008 | Freedman et al. |
| 2008/0244465 A1 | 10/2008 | Kongqiao et al. |
| 2008/0244468 A1 | 10/2008 | Nishihara et al. |
| 2008/0267449 A1 | 10/2008 | Dumas et al. |
| 2008/0282202 A1 | 11/2008 | Sunday |
| 2009/0006292 A1 | 1/2009 | Block |
| 2009/0027337 A1 | 1/2009 | Hildreth |
| 2009/0037849 A1 | 2/2009 | Immonen et al. |
| 2009/0040215 A1 | 2/2009 | Afzulpurkar et al. |
| 2009/0060268 A1 | 3/2009 | Roberts et al. |
| 2009/0074248 A1 | 3/2009 | Cohen et al. |
| 2009/0077504 A1 | 3/2009 | Bell et al. |
| 2009/0079813 A1 | 3/2009 | Hildreth |
| 2009/0080526 A1 | 3/2009 | Vasireddy et al. |
| 2009/0085864 A1 | 4/2009 | Kutliroff et al. |
| 2009/0102788 A1 | 4/2009 | Nishida et al. |
| 2009/0102800 A1 | 4/2009 | Keenan |
| 2009/0103780 A1 | 4/2009 | Nishihara et al. |
| 2009/0108649 A1 | 4/2009 | Kneller et al. |
| 2009/0109036 A1 | 4/2009 | Schalla et al. |
| 2009/0110292 A1 | 4/2009 | Fujimura et al. |
| 2009/0115721 A1 | 5/2009 | Aull et al. |
| 2009/0116742 A1 | 5/2009 | Nishihara |
| 2009/0116749 A1 | 5/2009 | Cristinacce et al. |
| 2009/0129690 A1 | 5/2009 | Marcellin et al. |
| 2009/0150160 A1 | 6/2009 | Mozer |
| 2009/0153366 A1 | 6/2009 | Im et al. |
| 2009/0153655 A1 | 6/2009 | Ike et al. |
| 2009/0180668 A1 | 7/2009 | Jones et al. |
| 2009/0183125 A1 | 7/2009 | Magal et al. |
| 2009/0183193 A1 | 7/2009 | Miller, IV |
| 2009/0189858 A1 | 7/2009 | Lev et al. |
| 2009/0208057 A1 | 8/2009 | Wilson et al. |
| 2009/0222149 A1 | 9/2009 | Murray et al. |
| 2009/0228841 A1 | 9/2009 | Hildreth |
| 2009/0231278 A1 | 9/2009 | St. Hilaire et al. |
| 2009/0244309 A1 | 10/2009 | Maison et al. |
| 2009/0249258 A1 | 10/2009 | Tang |
| 2009/0262986 A1 | 10/2009 | Cartey et al. |
| 2009/0268945 A1 | 10/2009 | Wilson et al. |
| 2009/0273563 A1 | 11/2009 | Pryor |
| 2009/0273574 A1 | 11/2009 | Pryor |
| 2009/0273575 A1 | 11/2009 | Pryor |
| 2009/0278915 A1 | 11/2009 | Kramer et al. |
| 2009/0295738 A1 | 12/2009 | Chiang |
| 2009/0296991 A1 | 12/2009 | Anzola |
| 2009/0315740 A1 | 12/2009 | Hildreth et al. |
| 2009/0316952 A1 | 12/2009 | Ferren et al. |
| 2010/0302376 A1 | 12/2010 | Boulanger |
| 2011/0142309 A1 | 6/2011 | Zhang et al. |
| 2011/0210969 A1 | 9/2011 | Barenbrug |
| 2011/0211754 A1 | 9/2011 | Litvak |
| 2011/0249099 A1 | 10/2011 | Vandewalle et al. |
| 2012/0082368 A1 | 4/2012 | Hirai et al. |
| 2013/0243313 A1 | 9/2013 | Civit |
| 2014/0056472 A1 | 2/2014 | Gu |

OTHER PUBLICATIONS

Simoncelli, E.P. et al., "Shiftable Multi-scale Transforms", *IEEE Transactions on Information Theory* V. 38, (Mar. 1992),587-607.

Simoncelli, E.P. et al., "The Steerable Pyramid: A Flexible Architecture for Multi-Scale Derivative Computation", *Proceedings of ICIP-95* V. 3, (Oct. 1995),444-447.

Chen, J et al., "Adaptive Perceptual Color-Texture Image Segmentation", *IEEE Transactions on Image Processing*, v. 14, No. 10, (Oct. 2005),1524-1536 (2004 revised draft).

Halfhill, Tom R., "Parallel Processing with CUDA", *Microprocessor Report*, Available at http://www.nvidia.com/docs/IO/55972/220401_Reprint.pdf,(Jan. 28, 2008).

Farber, Rob "CUDA, Supercomputing for the Masses: Part 4, The CUDA Memory Model", *Under the High Performance Computing section of the Dr. Dobbs website*, p. 3 available at http://www.ddj.com/hpc-high-performance-computing/208401741, 3.

(56) References Cited

OTHER PUBLICATIONS

Rajko, S et al., "HMM Parameter Reduction for Practice Gesture Recognition", *Proceedings of the International Conference on Automatic Gesture Recognition*, (Sep. 2008).
Hinton, Geoffrey et al., "A Fast Learning Algorithm for Deep Belief Nets", *Neural Computation*, V. 18, 1527-1554.
Susskind, Joshua M., et al., "Generating Facial Expressions with Deep Belief Nets", *Department of Psychology, Univ. of Toronto I-Tech Education and Publishing*, (2008),421-440.
Bleyer, Michael et al., "Surface Stereo with Soft Segmentation.", *Computer Vision and Pattern Recognition*. IEEE, 2010, (2010).
Chen, Junqing et al., "Adaptive perceptual color-texture image segmentation.",*The International Society for Optical Engineering*, SPIE Newsroom, (2006),1-2.
Forsyth. David A., et al., "Stereopsis", *In Computer Vision A Modern Approach Prentice Hall*, 2003, (2003).
Harris, Mark et al., "Parallel Prefix Sum (Scan) with CUDA", vol. 39, in *GPU Gems 3*, edited by Hubert Nguyen, (2007).
Hirschmuller, Heiko "Stereo Vision in Structured Environments by Consistent Semi-Global Matching", *Computer Vision and Pattern Recognition*, CVPR 06, (2006),2386-2393.
Ivekovic, Spela et al., "Dense Wide-baseline Disparities from Conventional Stereo for Immersive Videoconferencing", *ICPR*. 2004, (2004),921-924.
Kaldewey, Tim et al., "Parallel Search On Video Cards.", *First USENIX Workshop on Hot Topics in Parallelism* (HotPar '09), (2009).
Kirk, David et al., "Programming Massively Parallel Processors A Hands-on Approach", *Elsevier*, 2010, (2010).
Klaus, Andreas et al., "Segment-Based Stereo Matching Using Belief Propagation and a Self-Adapting Dissimilarity Measure", *Proceedings of ICPR 2006*. IEEE, 2006, (2006),15-18.
Kolmogorov, Vladimir et al., "Computing Visual Correspondence with Occlusions via Graph Cuts", *International Conference on Computer Vision*. 2001., (2001).
Kolmogorov, Vladimir et al., "Generalized Multi-camera Scene Reconstruction Using Graph Cuts.", *Proceedings for the International Workshop on Energy Minimization Methods in Computer Vision and Pattern Recognition*. 2003., (2003).
Kuhn, Michael et al., "Efficient ASIC Implementation of a Real-Time Depth Mapping Stereo Vision System", *Proceedings of 2009 IEEE International Conference on Acoustics, Speech and Signal Processing*. Taipei, Taiwan: IEEE, 2009., (2009).
Li, Shigang "Binocular Spherical Stereo", *IEEE Transactions on Intelligent Transportation Systems* (IEEE) 9, No. 4 (Dec. 2008), (Dec. 2008),589-600.
Marsalek, M et al., "Semantic hierarchies for visual object recognition", *Proceedings of IEEE Conference on Computer Vision and Pattern Recognition*, 2007. CVPR '07. MN: IEEE, 2007, (2007),1-7.
Metzger, Wolfgang "Laws of Seeing", *MIT Press*, 2006, (2006).
Min, Dongbo et al., "Cost Aggregation and Occlusion Handling With WLS in Stereo Matching", Edited by IEEE. *IEEE Transactions on Image Processing 17* (2008), (2008),1431-1442.
"NVIDIA: CUDA compute unified device architecture, prog. guide, version 1.1", *NVIDIA*, (2007).
Remondino, Fabio et al., "Turning Images into 3-D Models", *IEEE Signal Processing Magazine*, (2008).
Richardson, Ian E., "H.264/MPEG-4 Part 10 White Paper", White Paper/www.vcodex.com, (2003).

Sengupta, Shubhabrata "Scan Primitives for GPU Computing", *Proceedings of the 2007 Graphics Hardware Conference*. San Diego, CA, 2007, (2007),97-106.
Sintron, Eric et al., "Fast Parallel GPU-Sorting Using a Hybrid Algorithm", *Journal of Parallel and Distributed Computing* (Elsevier) 68, No. 10, (Oct. 2008),1381-1388.
Wang, Zeng-Fu et al., "A Region Based Stereo Matching Algorithm Using Cooperative Optimization", *CVPR*, (2008).
Wei, Zheng et al., "Optimization of Linked List Prefix Computations on Multithreaded GPUs Using CUDA", *2010 IEEE International Symposium on Parallel & Distributed Processing* (IPDPS). Atlanta, (2010).
Wiegand, Thomas et al., "Overview of the H.264/AVC Video Coding Standard", *IEEE Transactions on Circuits and Systems for Video Technology 13*, No. 7, (Jul. 2003),560-576.
Woodford, O.J. et al., "Global Stereo Reconstruction under Second Order Smoothness Priors", *IEEE Transactions on Pattern Analysis and Machine Intelligence* (IEEE) 31, No. 12, (2009),2115-2128.
Yang, Qingxiong et al., "Stereo Matching with Color-Weighted Correlation, Hierarchical Belief Propagation, and Occlusion Handling", *IEEE Transactions on Pattern Analysis and Machine Intelligence* (IEEE) 31, No. 3, (Mar. 2009),492-504.
Zinner, Christian et al., "An Optimized Software-Based Implementation of a Census-Based Stereo Matching Algorithm", *Lecture Notes in Computer Science* (SpringerLink) 5358, (2008),216-227.
"PCT Search report", PCT/US2010/035717, (dated Sep. 1, 2010),1-29.
"PCT Written opinion", PCT/US2010/035717, (dated Dec. 1, 2011),1-9.
"PCT Search report", PCT/US2011/49043, (dated Mar. 21, 2012), 1-4.
"PCT Written opinion", PCT/US2011/49043, (dated Mar. 21, 2012), 1-4.
"PCT Search report", PCT/US2011/049808, (dated Jan. 12, 2012), 1-2.
"PCT Written opinion", PCT/US2011/049808, (dated Jan. 12, 2012), 1-5.
"Non-Final Office Action", U.S. Appl. No. 12/784,123, (dated Oct. 2, 2012), 1-20.
"Non-Final Office Action", U.S. Appl. No. 12/784,022, (dated Jul. 16, 2012), 1-14.
Tieleman, T et al., "Using Fast weights to improve persistent contrastive divergence", *26th International Conference on Machine Learning New York, NY ACM*, (2009),1033-1040.
Sutskever, I et al., "The recurrent temporal restricted boltzmann machine", *NIPS, MIT Press*, (2008),1601-1608.
Parzen, E "On the estimation of a probability density function and the mode", *Annals of Math. Stats.*, 33, (1962),1065-1076.
Hopfield, J.J. "Neural networks and physical systems with emergent collective computational abilities", *National Academy of Sciences*, 79, (1982),2554-2558.
Culibrk, D et al., "Neural network approach to background modeling for video object segmentation", *IEEE Transactions on Neural Networks*, 18, (2007),1614-1627.
Benggio, Y et al., "Curriculum learning", *ICML 09 Proceedings of the 26th Annual International Conference on Machine Learning*, New York, NY: ACM, (2009).
Benggio, Y et al., "Scaling learning algorithms towards AI. In L. a Bottou", *Large Scale Kernel Machines*, MIT Press,(2007).
Battiato, S et al., "Exposure correction for imaging devices: An overview", In R. Lukac (Ed.), *Single Sensor Imaging Methods and Applications for Digital Cameras*, CRC Press,(2009),323-350.

METHOD AND APPARATUS FOR ENHANCING STEREO VISION

CROSS REFERENCE TO RELATED APPLICATIONS

This application is a continuation of U.S. patent application Ser. No. 15/993,414, filed May 30, 2018 to El Dokor et al., currently pending, which is a continuation of U.S. patent application Ser. No. 15/136,904 to El Dokor et al., filed Apr. 23, 2016 to El Dokor et al., now U.S. Pat. No. 10,037,602, which is a continuation of U.S. patent application Ser. No. 14/226,858 to El Dokor et al., filed Mar. 27, 2014, titled Method and Apparatus for Enhancing Stereo Vision Through Image Segmentation, now U.S. Pat. No. 9,324,154, which is a continuation of U.S. patent application Ser. No. 13/316,606 to El Dokor et al. filed Dec. 12, 2011 titled Method and Apparatus for Enhanced Stereo Vision, now U.S. Pat. No. 8,718,387, which is a continuation of U.S. patent application Ser. No. 13/297,029 filed 15 Nov. 2011 to Cluster et at. titled Method and Apparatus for Fast Computational Stereo, now U.S. Pat. No. 8,705,877, which is in turn a continuation of U.S. patent application Ser. No. 13/294,481 filed 11 Nov. 2011 to El Dokor et al. titled Method and Apparatus for Enhanced Stereo Vision, now U.S. Pat. No. 9,672,609. The '606 application is also a continuation of U.S. patent application Ser. No. 13/297,144 filed 15 Nov. 2011 to Cluster et al. titled Method and Apparatus for Fast Computational Stereo, now U.S. Pat. No. 8,761,509, which is in turn a continuation of U.S. patent application Ser. No. 13/294,481 filed 11 Nov. 2011 to El Dokor et al. titled Method and Apparatus for Enhanced Stereo Vision, now U.S. Pat. No. 9,672,609.

BACKGROUND OF THE INVENTION

Systems and methods for generating depth maps for images have suffered from lack of precision and requirements for great computing resources. Additionally, specialized hardware is often required in order to generate such a depth map. Imprecision in generation of such a depth map may result in poor resolution of acquired images and difficulty in identifying precise locations of objects within those depth maps. Without such precise identification of these locations, later processing of these images and objects may result in a reduced ability to rely on these locations and objects for additional processing.

Therefore, it would be desirable to present a method and apparatus that overcomes the drawbacks of the prior art.

SUMMARY OF THE INVENTION

In accordance with various embodiments of the present invention, a method and apparatus is provided for stabilizing segmentation and depth calculations. The inventors of the present invention have presented, in U.S. patent application Ser. No. 13/025,038, titled "Method and Apparatus for Performing Segmentation of an Image", filed Feb. 10, 2011 to El Dokor et al., Ser. No. 13/025,055, titled "Method and Apparatus for Disparity Computation in Stereo Images: filed February 10 to El Dokor et al., and Ser. No. 13/025,070, titled "Method and Apparatus for Determining Disparity of Texture", filed Feb. 10, 2011 to El Dokor et al., the entire contents of each of these applications being incorporated herein by reference, a case for describing various types of segments, labeled as stable or unstable segments, used for developing a disparity map. This is described as being accomplished by matching such segments with their appropriate counterparts between the two images in a stereo image sequence. Building on the implementation described in the above-mentioned applications, in accordance with various embodiments of the present invention, a series of criteria is presented for updating the various segments, specifically with the goal of efficient and accurate depth map updating.

As is described in the '038, '055 and '070 applications, it is meaningful to look only at one or more changes associated with a given stereo image sequence to produce a subsequent depth map and not the entire image. Thus, rather than recomputing an entirely new depth map for each pair of stereo images over time, only changes between consecutive frames are computed and integrated into one composite depth map. This process is not only computationally more efficient than recomputing the complete depth map for each stereo frame pair, it is also more accurate for matching, since only regions with significant changes are being matched in any given frame or sequence of frames. This is an altogether novel approach to computational stereo as previous attempts have been faced with a significant amount of computational complexity, problems with limiting a candidate space of depth calculations, and a nebulous set of features at best to extract from, without these features being robust to significant changes in the scene's quality or even overall color scheme.

In accordance with various embodiments of the present invention, a framework with which such an approach can be accomplished is provided, defining various types of regions and segments that are associated with such an approach. Also presented are other relevant aspects and features to develop a set of factors that can improve the accuracy of segmentation and the accuracy of the depth map itself, by presenting a shallow-depth of field concept with two different realizations.

Still other objects and advantages of the invention will in part be obvious and will in part be apparent from the specification and drawings.

The invention accordingly comprises the several steps and the relation of one or more of such steps with respect to each of the other steps, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

One or more embodiments of the invention will now be described, making reference to the following drawings in which like reference numbers indicate like structure between the drawings.

An image scene may be organized into a series of homogenized segments, or "regions", defined by their color, texture properties or other relevant properties. Each of these regions defines one or more segments in the image. The challenge for creating a disparity map (and hence, a depth map) from such segments lies in matching these segments against their correct counterparts in a secondary image (the other image in, for example, a stereo pair of images). To accomplish that, an even bigger challenge is associated with segmenting these images into segments of meaningful context. The above-mentioned '038, '055 and '070 applications present a more detailed discussion of the different clustering techniques that may be associated with defining segments, and associated matching techniques. One of the most important assumptions that was made in these applications, and that carries through to the present invention, is that changes in the image, in general, are very gradual. While there are regions of abrupt changes, they are few in relationship to an entire image sequence. Most regions exhibit this well-behaved and gradual change. Such gradual transition allows exploitation of redundancy of data between frames to:

1) Stabilize segments, since most segments mostly do not change, i.e. no differences in their pixel values between consecutive frames, based on intra-frame metrics; and 2) Stabilize a subsequent depth map, in that if segments associated with a given disparity value have not changed, then the subsequent depth map also should not change. This makes perceptual sense since changes in the scene's depth should be reflected by changes in the observed field of view.

Given these two general observations, in accordance with embodiments of the present invention, a more coherent approach to disparity-based depth compute is provided, in which the depth map is iteratively improved through segmentation, followed by depth computation. Temporal and spatial stability criteria of various segments become crucial to determining disparity updates, and hence depth map updates, since absent of such criteria a temporal-based approach can not be implemented, and the scene's temporal redundancy can not be successfully exploited. Tracking across such a broad range of features ensures that changes in the image are correctly accounted for and integrated into the depth map.

This novel approach to segmentation/depth map calculation allows a highly efficient and accurate depth map to be produced and enables a real-time implementation that can be embedded on smaller platforms, including (system-on-a-chip) SoC platforms, where an existing embedded GPGPU can provide the parallel computation that is preferred to implement this approach.

Figure 1:
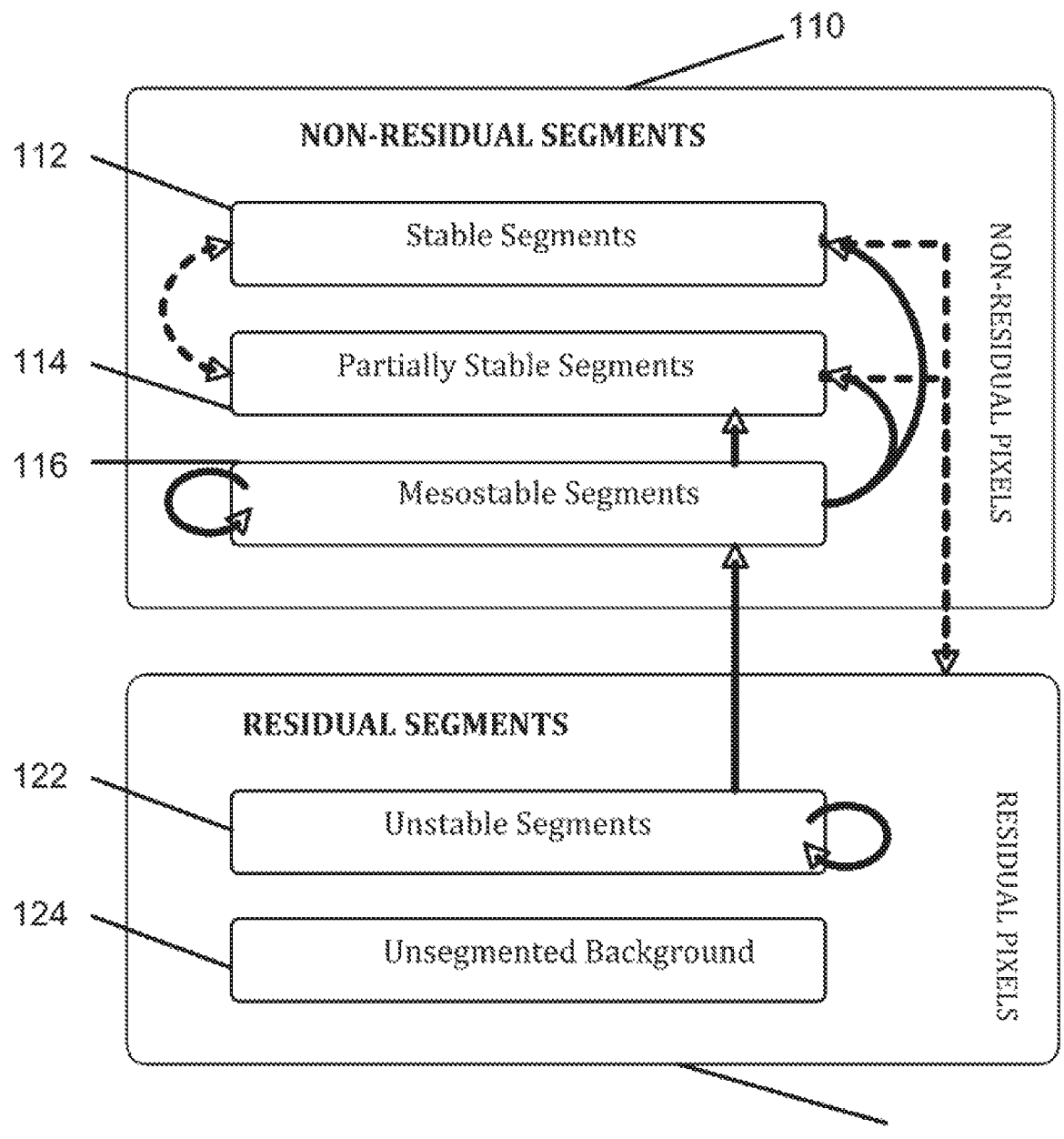
FIG. 1 is a flowchart diagram depicting relationships between a number of segment classifications in accordance with an embodiment of the invention.
Figure 2:
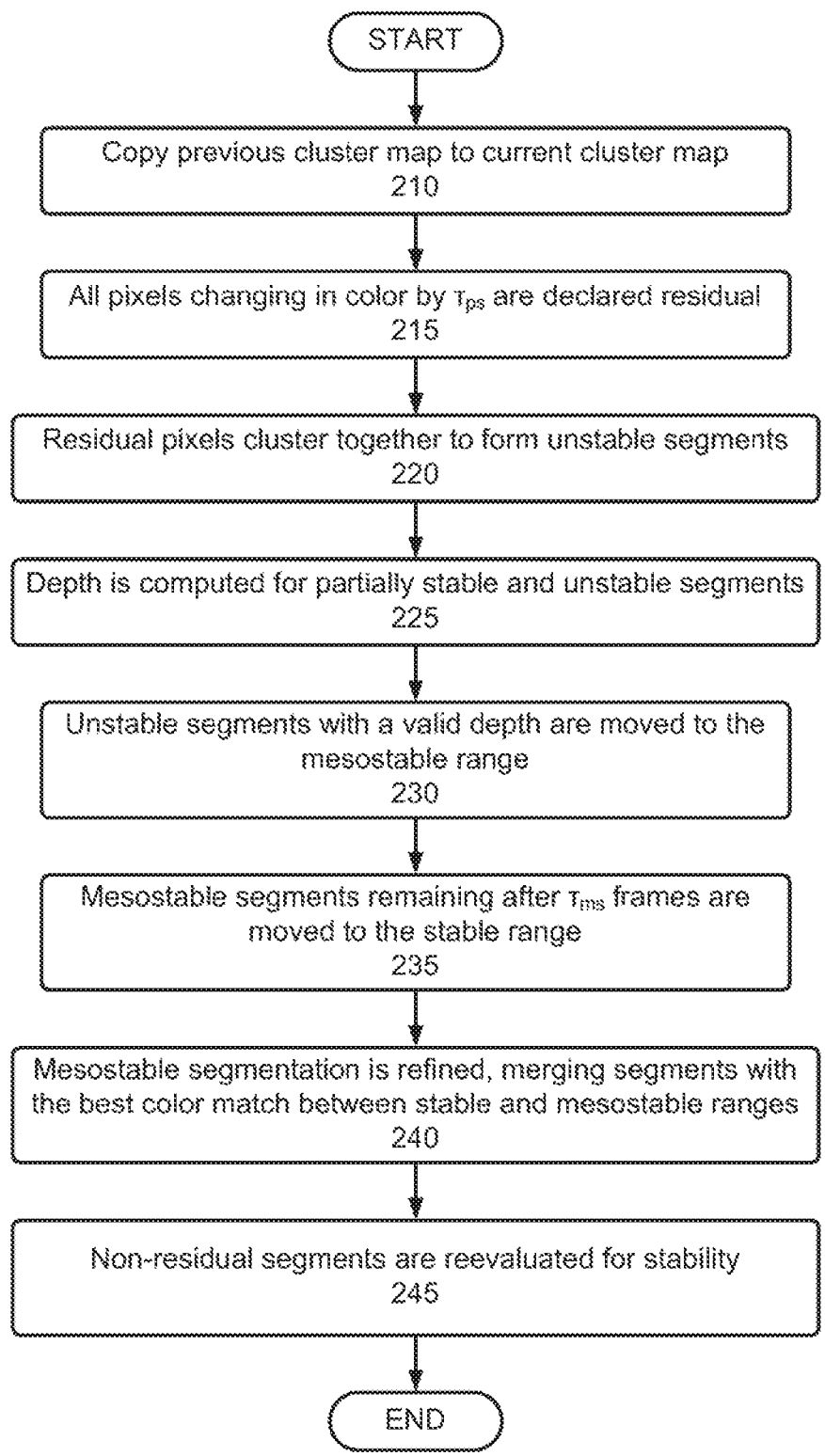
FIG. 2 is a flowchart diagram depicting processing for updating a depth map in accordance with a depth map in accordance with the invention.

Given the importance of stability criteria, embodiments of the present invention define various segment types that enhance scene understanding through such criteria, and exploit such criteria to understand scene changes across frames and within the same frame. Thus, as is shown in FIG. 1, five different segment types may be defined. These segments are preferably classified in two groups, non-residual segments 110 and residual segments 120. Residual segments 120 further may comprise stable segments 112, partially stable segments 114 and mesostable segments 116. Similarly, residual segments may comprise unstable segments 122 and unsegmented background 124. As is further shown in FIG. 1, pixels may move between these segments as will be described in accordance with the flowchart set forth in FIG. 2. Therefore, at step 210, a previous cluster map is copied and stored in memory as a current cluster map. Next, at step 215, all pixels that have changed in color by more than Tps (or frames) are declared residual. Then, at step 220, one or more residual pixels may be clustered together to form one or more unstable segments (as such because they are just formed). At step 225, depth is calculated for all partially stable and unstable segments. Then, the depth computed for the unstable segments is considered at step 230, and if the calculated depth is determined to be valid, the corresponding unstable segment is moved to the mesostable range. Mesostable segments remaining after Tms frames are moved to the stable range at step 235, and at step 240 mesostable segmentation is refined so that segments with the best color match between stable and mesostable ranges are merged. Finally at step 245, non-residual segments are reevaluated for stability.

Table 1, below, depicts the various segment types, and a description of characteristics of that segment type. As can be seen, stable segments have little or no change, while partially stable segments have a small amount of change, but the segment is still considered generally stable. Mesostable segments are transitioning from an unstable classification to a more stable classification, while an unstable segment has enough motion that it may have to be resegmented, and may be a result of any of the other classifications. Other/background segments include all other pixels that cannot be placed into a segment with other pixels.

TABLE I

Description of various segments and pixels.

| Pixel Classification | Segment Classification | Segment Subcategory | Description |
|---|---|---|---|
| Non-residual Pixels | Mostly Stable Segments | Stable Segments | Segments that have had little or no change |
| | | Partially Stable Segments | Segments with a small amount of change |
| | Mesostable Segments | | Segments that have partially stabilized from being unstable |
| Residual Pixels | Unstable Segments | | Segments with significant enough motion that have to be resegmented |

TABLE I-continued

Description of various segments and pixels.

| Pixel Classification | Segment Classification | Segment Subcategory | Description |
|---|---|---|---|
| | Other/Background | | Every other type of pixel, including background, filtered out pixels, noise, etc. |

Figure 3:
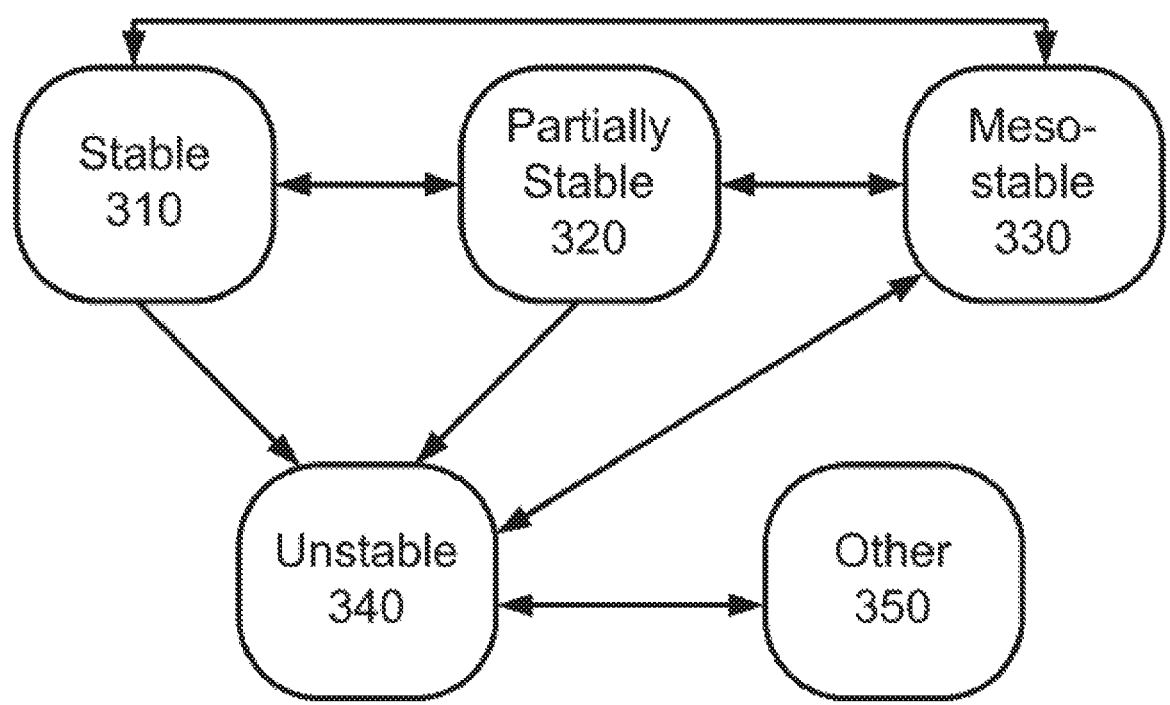
FIG. 3 is a state diagram depicting a relationship for movement between different pixel segments in accordance with an embodiment of the invention.

As is noted, pixels therefore may move between classifications based upon change associated therewith. A state diagram depicting movement paths between various classifications is shown at FIG. 3. As can be seen in FIG. 3 (as well as with the arrow indicators in FIG. 1), a stable segment 310 can remain a stable segment, can be changed to a partially stable segment 320 if a small amount of change is determined, or can be declared an unstable segment 340 if significant change is determined. Similarly, a partially stable segment 320 can become a stable segment 310 if it remains partially stable for a predetermined period of time, can become a mesostable segment 330 if some change below a predetermined threshold is detected, and can become an unstable segment 340 if significant change greater than a predetermined threshold is determined. Similarly, a mesostable segment 330 can become a partially stable segment 320 or a stable segment 310 if no change is determined, and it can become an unstable segment 340 if a lot of change is determined. Finally, various pixels in the unstable segments may be declared "other" (or unsegmented) 350 if they do not appear to be able to be segmented. The predetermined threshold may be predefined, or learned in accordance with processing of data.

Therefore, pixels may be classified into one of the two general classes: residual pixels, i.e. pixels that have changed in the image as determined in accordance with one or more intra-frame metrics, and non-residual pixels representing pixels that have not changed, also based on such metrics. Segments undertake the overall process described earlier: they may be first created, by identifying pixels that are residual. They then may migrate to states of mesostability or stability, depending on the associated criteria. A depth may be computed and associated with such segments, and then a second depth-based segmentation step may be implemented. By default, any pixel or group of pixels that have not been assigned to stable or mesostable, are assigned to unstable.

Organizing a scene into various segments is preferably predicated upon the concept that neighboring pixels generally exhibit similar behavior, and hence generally do belong to the same segment. This behavior may involve characteristics of motion, color changes, texture features, or any combination of features. The exception to this notion lies at object boundaries and/or at depth discontinuities.

Once objects, or segments, are identified as stable or unstable, the natural progression is towards cluster numbers that stabilize the process over time, so that only changes in images are accounted for. This general theoretical approach, though very different in its details, is widely exploited in video encoding (Wiegand, Sullivan, Bjøntegaard, & Luthra, 2003) at a much more basic level, in which segments are considered for dominant features for texture or motion-based coding. The most substantial contribution and difference here is the explicit definition of different segment types, their lifecycle, and the associated pixel states, aspects of the work that are not present in video coding. Additionally video coding techniques do not attempt to glean or extract depth or even associated segments with various depths. The invention as set forth in one or more embodiments of the present invention also exploits advances in GPU computing to parallelize the process of clustering and scene organization.

The utilization of image segments for calculating depth and iteratively improving segmentation through gleaning scene queues of perceptual relevance allows disparity computation to take place in a very efficient manner. A feature, such as motion, that can be a very dominant feature in scene analysis, can be extracted from mesostable segments, i.e., segments transitioning between an unstable state and a stable one. Local changes in the image that are associated with motion may be clustered and tracked through residual segmentation first. Disparities may then be computed by only matching such segments with ones that represent similar mesostable changes and ignoring all other pixels. Hence, the search space that is associated with disparity matching is greatly reduced, and matching accuracy is enhanced. Once depth is computed, a new depth map can be reclustered based on combining stable segments with recently depth-computed mesostable segments.

Figure 4:
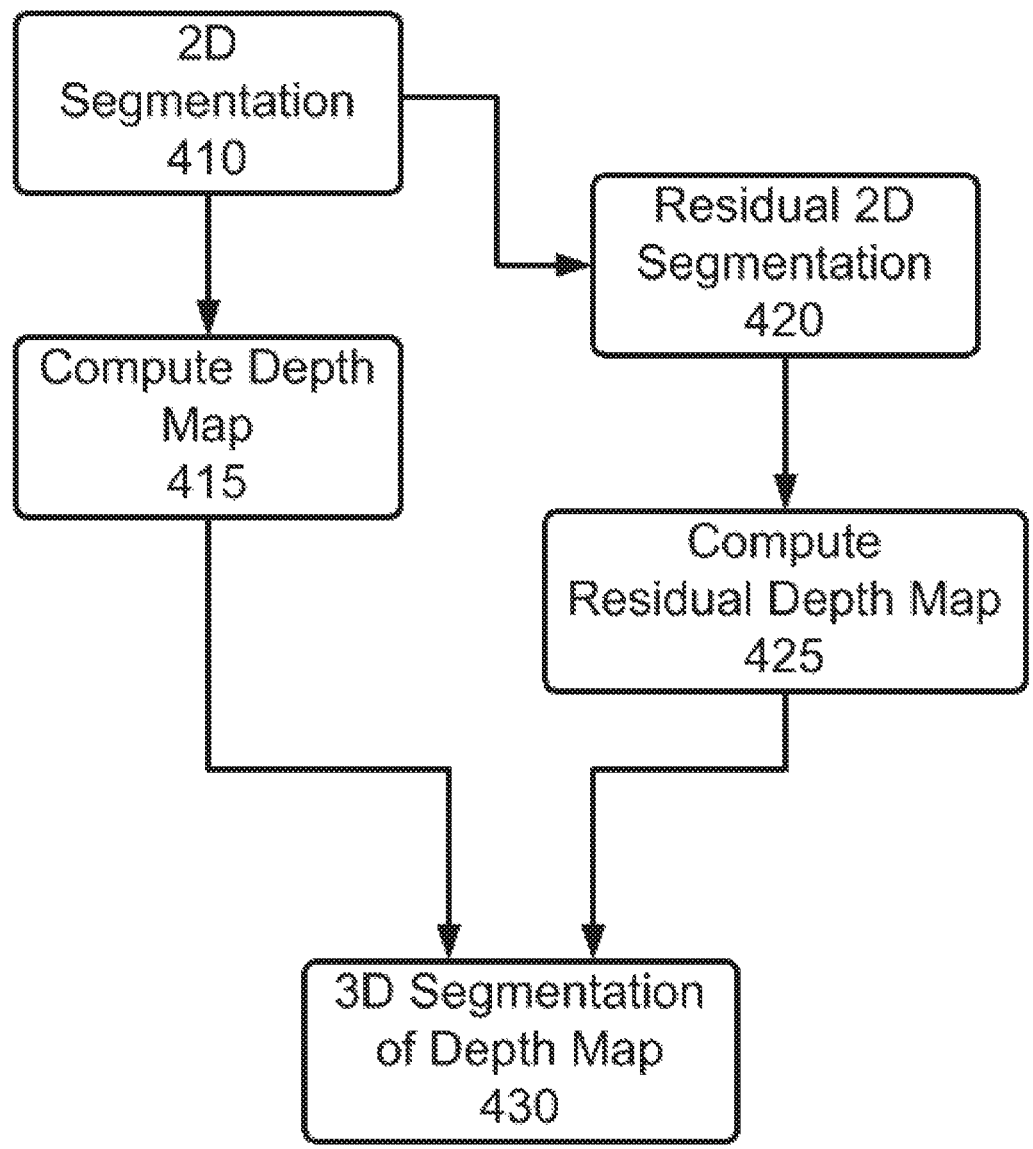
FIG. 4 is a flowchart diagram depicting 3D segmentation of a depth map.

FIG. 4 depicts a process associated with this inventive approach. 2D Segmentation may be first attempted at step 410 on the image sequence and regions are broken into homogeneous segments of color/texture/orientation and scale. For orientation and scale, it is preferred that a variant of the complex wavelet transform be used to extract texture information. A depth map is preferably next computed in step 420, based on the segmentation step. In real-time, unstable pixels may be clustered together to form residual regions that are segmented separately in step 415 and then have their depth computed next at step 425. The newly computed regions' residual depth map may then be combined with the stable depth map at step 430. The overall composite map may then be reclustered by combining mesostable segments with stable segments in a step that also involves segmentation based on depth.

Similar to the process noted above, one or more color spaces may be combined together to produce meaningful segmentation processing. In accordance with another embodiment of the present invention, not only are residual segments computed, but a scene may be broken down into two or more orthogonal scenes: one of high Chroma (color world) and one of low Chroma (gray world). The two scenes may then be segmented, and then the steps set forth in FIG. 4 may also be implemented for each segmentation. The result is a more complete and comprehensive depth map. In the gray world, intensity becomes a dominant feature, with extracted scale-space and frequency features being used in disparity decomposition. As a result, the task of depth map computation may be been divided into two tasks, depending on the individual pixel's (and associated regions') dominant features: for color pixels, hue is a good representation of color. For low-Chroma pixels, intensity helps in differentiating the pixel. Gradients and structures that are associated with these features can be extracted, as well as the scales that are associated with such gradients. However, the fundamental approach described earlier remains unchanged, namely: performing segmentation and/or residual segmentation, and then computing depth on both, and combining the results in an overall composite depth map.

Figure 5:
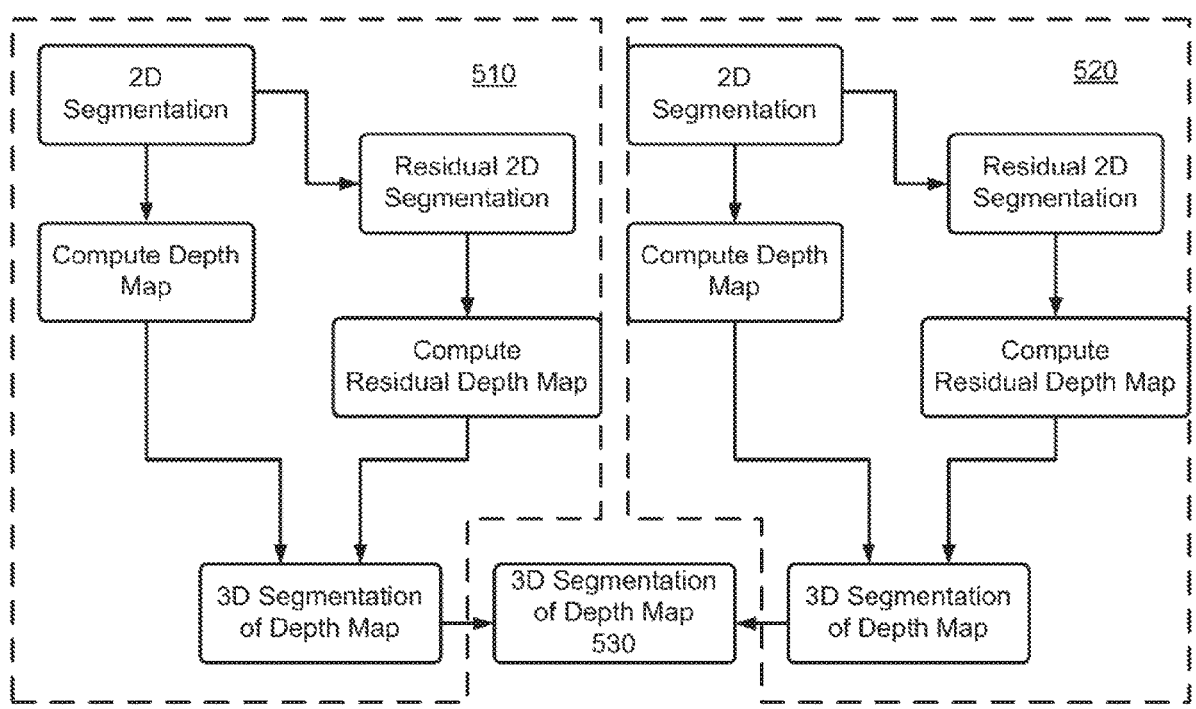
FIG. 5 is a flowchart diagram depicting 3D segmentation of a depth map using gray world and color world segments.

Once the gray world depth map has been created, it can be easily combined and fused with the high-Chroma depth map, presented earlier. FIG. 5 represents the algorithm with the two processes running simultaneously, 510 representing the processing of FIG. 4 applied to the color world data and 520 representing the processing of FIG. 4 applied to the gray world. In the particular embodiment of FIG. 5, data need not be shared between the two processes, but rather, the final result is preferably combined to produce a composite depth map 530.

Figure 6:
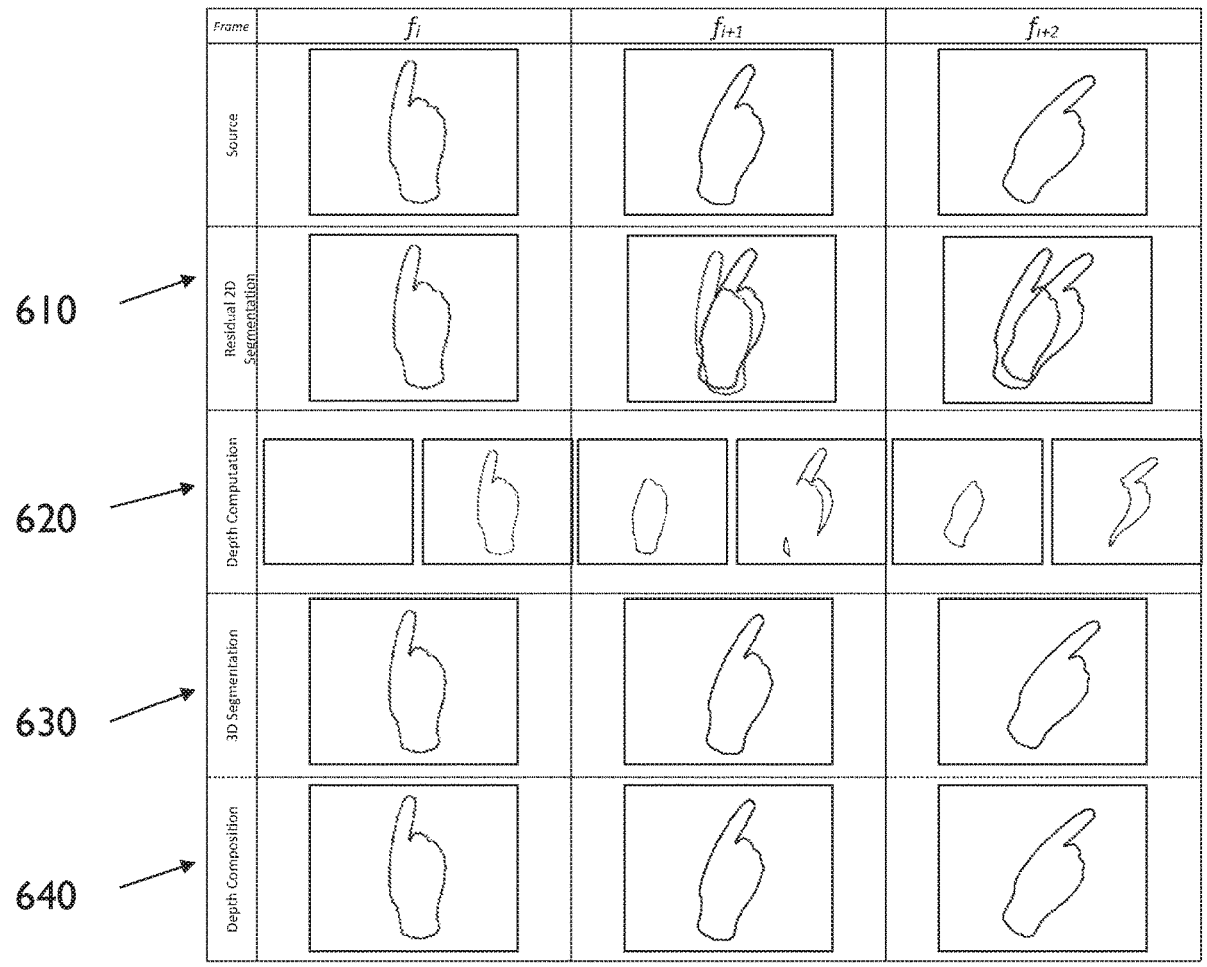
FIG. 6 depicts a number of steps for segmentation and depth calculation in accordance with an embodiment of the invention.

FIG. 6 depicts a three-frame sequence in which depth computation may be performed, in two aspects: for stable segments as well as the unstable segments. After initial segmentation of unstable segments, a depth computation is performed on partially stable segments as well as mesostable segments. Therefore, as is shown in FIG. 6, row 610 depicts a series of source images at frames $f_i$, $f_{i+1}$, $f_{i+2}$. In this particular example, an idealized movement of a user's arm is shown between frames in a sequence, these frames not necessarily being consecutive. Employing the residual 2D segmentation process described above, row 620 depicts such residual segmentation, and in particular depicts the positioning of the hand in the prior frame and the new position overlaid. Areas of the new position that overlap the old position are further segmented. Row 630 then shows the results of depth computation, figuring the depth of each of the segments shown in the residual segmentation process of row 620. Row 640 depicts performance of 3D segmentation as described, and finally depth composition is shown at row 650. Thus, in accordance with FIG. 6, a three-frame sequence in which depth computation is performed is shown. The depth computation may be performed in two aspects: for stable segments as well as for unstable segments. After initial segmentation of unstable segments, depth computation may be performed on partially stable segments as well as mesostable segments.

In accordance with another embodiment of the present invention, based upon the determination that video sequences are well behaved, then one may make the additional useful assumption that any associated segmentation map and any additional subsequently computed maps are likely also well behaved. Thus, even when confronted with a given partially stable segment whose disparity is to be recalculated, a well-behaved segment allows the assumption that a newly computed disparity for that segment is likely in the neighborhood of the old one from the previous frame, as the segment may be tracked across one or more frames. As such, it is possible to define two second level types of stability for a particular partially stable segment:

1. Major stability, indicating that very few pixels have changed. Thus, it may be determined that there has not been enough change to warrant a reevaluation of the segment's disparity, i.e. new depth calculation.
2. Minor stability, indicating that enough of the pixels have changed that depth is to be recalculated.

If segment stability does not fall into either of the above mentioned categories, and it is therefore determined that the segment is unstable, then pixels associated with this segment are preferably classified as unstable and the entire segmentation process may be repeated.

All pixels in corresponding images are preferably marked with their respective states. This is particularly important since matching relevant pixels with each other across frames requires a mechanism with which such pixels are correctly marked. From an implementation perspective, marking pixels during disparity decomposition in a manner as described in the above-mentioned '038, '055 and '070 applications, while matching, is an effective interpretation of this approach. Marked out pixels cannot contribute to further matching during the disparity decomposition step, and so false positives are reduced. Disparity decomposition, as described in the above-mentioned '038, '055 and '070 applications can be conducted left-to-right or right-to-left, and pixels with existing and accurate disparity can be marked out to reduce the search space that is associated with the disparity decomposition.

Block-Based GPU Clustering and Implementation on a Discrete GPU or an Integrated GPU of a System on a Chip GPU technology allows for launching of multiple simultaneously processed threads for processing video images. The threads are preferably managed by a thread scheduler, each thread adapted to work on one or more pixels in an image. See (NVIDIA: CUDA compute unified device architecture, prop. guide, version 1.1, 2007) for more details. Groups of threads may be combined to process pixel blocks with having rectangular or other desirable dimensions. One or more methods for clustering of such pixels employing GPU-based implementations are described in the above-mentioned '038, '055 and '070 applications, in which block based statistics are first computed and then combined across blocks. As a direct result of this process, localized statistics representing intermediate results of various clusters at GPU block-level (from the GPU architecture) are available. Additionally, one or more global statistics constituting localized combinations of all the localized block-level statistics are also available. This means that for any given cluster, both localized as well as global statistical information is available for segmentation. This same paradigm would also apply to GPUs that are integrated onboard an SoC, like ARM's MALI or Imgtec's SGX PowerVR or any other GPU or GPU IP representation involving the utilization of SIMD architectures and calling functions.

When performing segmentation of an image, one of the biggest challenges involves finding the correct optimizations of local and global metrics that are associated with a given segment or cluster to allow for appropriate clustering of different segments in an image. For any given residual segment, clustering an existing stable segment not only requires global statistics, but also local ones. This is especially true for larger segments, in which global statistics may vary drastically from local ones, especially in the presence of a color or texture gradient. Two segments may have very different overall global statistics, but they may also have local statistics that are well suited to allow them to cluster together. Utilizing the GPU's intrinsic properties involving launching blocks of threads to operate on contiguous data, adjacent blocks that belong to two different clusters may be very similar and can be used to combine clusters together. This can also apply for tracking changes in blocks of data that are associated with larger segments. Utilizing block-based statistics allows segments to remain relatively stable as they transition between states, and as they temporally progress and evolve through an image sequence.

The thread scheduler can also be modified through configuration settings, to account for such a computational stereo approach.

The inventive approach specifically utilizes the GPU's thread scheduler as a means of imposing local metrics on image segmentation. As a result, local metrics become an intrinsic consequence of the GPU architecture, provided appropriate implementation in either software or hardware or both.

A GPU-based architecture can then be designed to optimize the utilization of the GPU's thread scheduler for segmentation. Arithmetic Logic Units (ALUs) can be used to process adjacent pixels in an image, local changes being associated with thread blocks and global changes being represented as combinations of such local changes. Merging at the block level before merging on the grid level, i.e. entire image, allows all threads in a block to write to fewer locations, mitigating many atomic operations. Atomic operations are a common bottleneck associated with computer vision algorithms being implemented on GPGPU architectures.

Shallow Depth of Field

Depth of field is that part of the field of view of a camera that contains the sharpest edges (the amount of sharpness in the scene), see (Peterson, 2010). Peterson defines three major factors contributing to depth of field:

The focal length of the lens

The distance between the sensor and the object in the field-of-view

Aperture of the lens

A shallow depth of field has the effect of blurring objects outside regions with high sharpness (i.e. outside regions in focus). The blurring effect can aid in identifying background objects. Features associated with scale and frequency can be exploited to mitigate the background objects, reduce scene clutter, and improve depth computation accuracy.

Various embodiments of the present invention include at least two approaches to mitigate excessive FLOPs computation based on exploiting properties of the field-of-view through blurring the background with a shallow depth of field. In doing so, the background selectively stands in contrast to the foreground, and can be removed through the utilization of large-scale low pass filtering kernels or selective wavelet-based filtering, since background blurriness becomes a salient feature of the scene and can be exploited. During residual segmentation, having a shallow depth of field enhances matching foreground-segmented objects, since erroneous background objects are minimized with a more blurred background model. There are many techniques to highlight the fundamental differences between the foreground and background in a scene with a shallow depth of field. Techniques like PCA, SVM, or training a Neural Network can be used to detect such regions' features. There also exists prior work in the literature on sharpness metrics that can also be applied in this case to enhance foreground-background discriminability. The two methods for reducing such depth of field will now be described.

Space-Frequency Feature Extraction for Segment Matching

One inventive approach for matching segments or image regions is to utilize space-frequency features utilizing tools such as wavelet decomposition. Therefore, in accordance with an embodiment of the present invention, the following process may be employed. First, a candidate segment is preferably defined, $\tilde{s}_R(x,y)$, whose disparity is being evaluated. An operator $F\{\psi_R(x,y)\}$ is also defined such that $\psi_R(x,y)$ is a basis function. A space-frequency decomposition may therefore be defined as:

$$R_{\tilde{s}_R}(x,y) = \tilde{s}_R(x,y) * F\{\psi_R(x,y)\}$$

As noted above, such features allow a background model to be extracted and utilized in matching and segmentation. With a background that is relatively uniform and smooth, frequency-space decomposition can then be applied to the scene, with a background model whose main features constitute spatially larger scales as well as lower frequencies. The task of matching foreground objects with their correct disparities then becomes simpler, given the relative consistency of background features.

Figure 7:
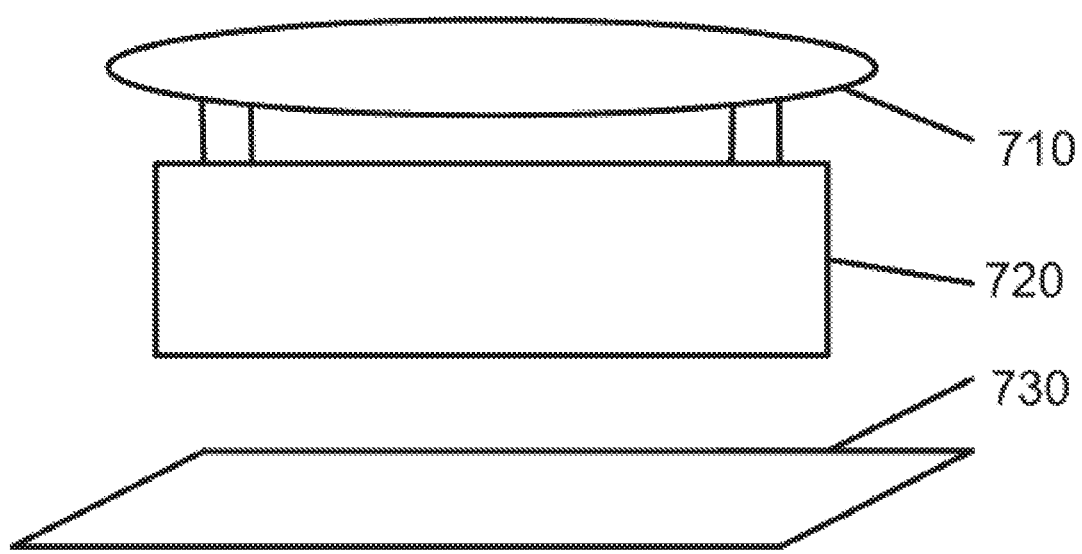
FIG. 7 depicts the relationship of a MEM-mounted lens and an image sensor in accordance with an additional embodiment of the invention.

Utilizing Micro-Electronic Machines (MEMS) for Adaptive Focus/Defocus and Aperture Size Modification An alternative approach to enabling background defocus, or blurring is through changing the background model via varying the focal length by mounting the lens on microelectronic machines (MEMs). Therefore, as is shown in FIG. 7, a lens 710 is mounted to a MEM 720 allowing for varying a distance between the lens 710 and a sensor 730. Once lens 710 is mounted, MEM 720 can modify the focal length based on optimal depth engine feedback. This can be performed iteratively with the depth engine. So, if the foreground segmentation quality is poor, a shallower depth of field may be accomplished by employing MEM 720 that allows lens 710 to expand away from, or towards sensor 730, varying the focal length in real-time. Another advantage of utilizing MEMs lies in the ability to define a narrow depth of field by varying both the aperture as well as the focal length.

As a result, another approach can be suggested in which an artificial intelligence system, such as the one that has been described in the above-mentioned '038, '055 and '070 applications, can be used to evaluate the quality of segmentation. The AI can then interactively vary the image by enhancing segmentation through a narrower, or shallower depth of field, in whichever configuration that the application requires.

Therefore, in accordance with various embodiments of the present invention, a series of steps are provided for enhancing stability criteria of computational stereo. Inventive segment definitions are presented, as well as their transition criteria from unstable to stable, and between the various inventive additional segment definitions. The concept of computing depth on one or more residual components of an image sequence is also presented. Orthogonal decomposition of an image sequence in the color space may enhance disparity decomposition by reducing the overall population of candidate pixels that can match for a given disparity. A final depth map may be comprised of composites of all the different depth maps that are produced in these orthogonal projections. Additionally, depth of field of a scene may be manipulated to highlight differences between the foreground and background and improve depth computation through segment matching and background manipulation/modeling. A new, dynamic approach to varying the depth of field and the subsequent depth compute via MEMs is also presented.

API/SDK

In accordance with a further embodiment of the invention, an API is presented that preferably takes advantage of the information provided from the depth computation, such that critical points, gesture events, as well as overall depth information is provided as part of the API. Additionally, an SDK is preferably presented such that software developers can take advantage of these various features.

What is claimed:

1. A method for segmenting an image, comprising the steps of:
   determining one or more unstable segments of one or more segments defined from a plurality of images changing by more than a predetermined threshold between two of the plurality of images;

determining one or more transitioning segments transitioning from an unstable to a stable segment between two of the plurality of images;

determining depth only for one or more of the one or more unstable segments that have changed by more than the predetermined threshold and for one or more of the one or more transitioning segments; and updating a preexisting depth map with only the depth for the one or more unstable segments and the one or more transitioning segments.

2. The method of claim 1 wherein the transitioning segments comprise one or more mesostable segments.

3. The method of claim 1, wherein the segments are defined from a stereo pair of images.

4. The method of claim 1, wherein the determined depth for the one or more unstable and transitioning segments replaces a prior corresponding depth value in the preexisting depth map.

5. The method of claim 1, further comprising the step of generating a new depth map associated with the one of the plurality of images in accordance with the determined depth for the one or more unstable segments, the one or more transitioning segments, and the preexisting depth map.

6. The method of claim 5, further comprising the step of repeating the process for generating the new depth map of a next sequential frame from the plurality of acquired images, such that only the changes in depth are computed.

7. The method of claim 6, wherein a depth map associated with a next frame is generated by starting with the depth map associated with the one of the plurality of images, and recalculating depth associated with one or more unstable segments or portions of such segments that have changed by more than the predetermined threshold and one or more transitioning segments.

8. The method of claim 1, wherein the predetermined threshold may be learned.

9. The method of claim 1, further comprising the step of combining one or more transitioning segments with a stable segment to produce a different stable segment.

10. A computer program stored to a non-volatile computer medium, the computer program causing a multi-purpose computer to segment an image by performing the steps of:

defining one or more segments from one of a plurality of images;

determining one or more unstable segments of the one or more segments defined from a plurality of images changing by more than a predetermined threshold from a prior between two of the plurality of images;

determining one or more transitioning segments transitioning from an unstable to a stable segment between two of the plurality of images;

determining depth only for one or more of the one or more unstable segments that have changed by more than the predetermined threshold and for one or more of the one or more transitioning segments; and updating a preexisting depth map with only the combining the determined depth for the one or more unstable segments and the one or more transitioning segments with a preexisting depth map.

11. The computer program of claim 10, wherein the transitioning segments comprise one or more mesostable segments.

12. The computer program of claim 10, wherein the segments are clustered from a stereo pair of images.

13. The computer program of claim 10, wherein the determined depth for the one or more unstable and transitioning segments replaces a prior corresponding depth value in the preexisting depth map.

14. The computer program of claim 13, further comprising the step of generating a new depth map associated with the one of the plurality of images in accordance with the determined depth for the one or more unstable segments, the one or more transitioning segments, and the preexisting depth map.

15. The computer program of claim 14, further comprising the step of repeating the process for generating a depth map of a next sequential frame from the plurality of images.

16. The computer program of claim 15, wherein a depth map associated with a next frame is generated by starting with the depth map associated with the one of the plurality of images, and recalculating depth associated with one or more segments that have changed more than the predetermined threshold and one or more transitioning segments.

17. The computer program of claim 16, wherein the predetermined threshold is learned.

18. The computer program of claim 10, wherein one or more of the steps performed by the multi-purpose computer are performed by a graphical processing unit.

19. The computer program of claim 10, further comprising the step of assigning cluster numbers to the one or more segments according to their classification as unstable, transitioning or stable.

20. The computer program of claim 19, further comprising the step of changing the cluster number of a segment when the segment transitions from one classification to another.

* * * * *